United States Patent

Heynderickx et al.

Patent Number: 5,210,630
Date of Patent: May 11, 1993

[54] LIQUID-CRYSTAL DISPLAY DEVICE

[75] Inventors: Ingrid E. J. R. Heynderickx, Eindhoven, Netherlands; Dirk J. Broer, Wilmington, Del.; Rifat A. M. Hikmet, Eindhoven, Netherlands

[73] Assignee: U.S. Philips Corporation, New York, N.Y.

[21] Appl. No.: 929,848

[22] Filed: Aug. 13, 1992

Related U.S. Application Data

[63] Continuation of Ser. No. 598,320, Oct. 16, 1990, abandoned.

[30] Foreign Application Priority Data

Oct. 18, 1989 [NL] Netherlands ............................ 8902578

[51] Int. Cl.$^5$ .......................... C09K 19/54; G02F 1/13
[52] U.S. Cl. ................................ 359/106; 252/299.01; 252/299.5; 359/103; 359/105
[58] Field of Search ................... 359/93, 103, 105, 99, 359/101, 102, 106; 252/299.01, 299.5

[56] References Cited

U.S. PATENT DOCUMENTS

| | | | |
|---|---|---|---|
| 4,613,442 | 9/1986 | Yuki et al. | 252/1 |
| 4,637,896 | 1/1987 | Shannon | 252/299.7 |
| 4,802,732 | 2/1989 | Fukuma et al. | 385/105 |
| 4,802,743 | 2/1989 | Takao et al. | 359/104 |
| 4,844,569 | 7/1989 | Wada et al. | 359/53 |
| 4,913,530 | 4/1990 | Ichimura et al. | 252/299.01 |
| 4,917,471 | 4/1990 | Takao et al. | 359/75 |

Primary Examiner—Robert L. Stoll
Assistant Examiner—Shean C. Wu
Attorney, Agent, or Firm—Norman N. Spain

[57] ABSTRACT

A liquid-crystal display device having a twisted nematic liquid-crystalline material is provided with a layer of an optically anisotropic material to obtain a colourless display device which is rich in contrast. The optically anisotropic material is a synthetic resin composition comprising a polymer network having a helicoidal order manufactured from a curable liquid-crystalline composition having a chiral dopant.

2 Claims, 1 Drawing Sheet

LIQUID-CRYSTAL DISPLAY DEVICE

CROSS REFERENCE TO RELATED APPLICATION this is a continuation of application Ser. No. 07/598,320, filed Oct. 16, 1990, now abandoned.

Pending U.S. patent application Ser. No. 07/598,286, filed concurrently herewith, relates to a molecularly oriented synthetic resin composition, to a substrate clad with the composition, and to a method of producing it.

BACKGROUND OF THE INVENTION

The invention relates to a liquid-crystal display (LCD) device comprising a liquid-crystal cell having a twisted nematic liquid-crystalline material which is arranged between two substrates having electrodes and between two polarizers, and more particularly relates to such a device in which a layer of an optically anisotropic material is provided between the polarizers.

If desirable, the layer of optically anistropic material may be a self-supporting birefringent foil. Such a display device is described in European Patent Application 0 246 842.

Chirality in liquid-crystalline materials leads to rotation of the molecules in a direction perpendicularly to their longitudinal axis. In the case of liquid-crystalline materials in the so-called cholesteric phase, the pitch of the rotation is 0.1 to 1 $\mu$m. For application in, for example, datagraphic displays using multiplex drive, a larger pitch of the order of magnitude of the cell thickness of the display device is desirable. Such a pitch is obtained by adding a chiral liquid-crystalline compound as a dopant to a nematic liquid crystal. With such materials, supertwisted nematic (STN) liquid-crystal display devices are manufactured, the total twist of the molecular axis across the cell being, for example, between 180° and 270°. Such display devices have the disadvantage that the optical properties depend to a large extent on the wavelength, of the light so that a high contrast and a colourless image (black/white instead of e.g., blue/yellow) is difficult to attain. Said disadvantage can be overcome in a known manner by using a combination of two identical cells, one of which contains left-handed liquid-crystalline material and the other contains right-handed liquid-crystalline material. When the molecular axis at the front of the second cell extends perpendicularly to the molecular axis at the rear of the first cell the wavelength dependence of the optical properties is completely compensated. However, as a result of this second cell the liquid-crystal display device becomes heavier and less compact. According to a simpler alternative, the second cell is replaced by a uniaxial foil having an adapted birefringence. In this case, the compensation of wavelengths dependence is not complete, resulting in the display device exhibiting a contrast reduction and a certain degree of colour in the voltageless state. Another alternative consists in the use of a twisted stack of uniaxial foils. This solution gets closer to the ideal situation (a twist and a birefringence which are equal to the twist and birefringence of a supertwisted nematic liquid-crystal display device) as the number of foils increases. However, this leads to a considerably more complicated production process. Instead of a foil, it is alternatively possible to use a birefringent layer on a suitable substrate. In European Patent Application 1-0 007 574 a description is given of liquid-crystalline polymer materials having a chiral dopant in the form of a copolymerizable monomer. Such polymer materials are linear and have side groups which exhibit liquid-crystalline properties. A thin layer is manufactured from a solution or a melt and is oriented in the rubbery liquid-crystalline state, after which it is cooled to a temperature below the glass transition temperature. Such layers are often turbid owing to local fluctuations in the refractive index caused by a poor order. Moreover, heating above the glass transition temperature, executed only once, leads to a permanent loss of order. Besides, the method does not permit the pitch and the thickness of the polymer layer to be accurately adjusted.

One of the objects of the invention is to provide a liquid-crystal display device and a birefringent foil or layer of optically anisotropic material for use in such a display device, the birefringent foil or layer being optically clear and having a large temperature resistance. Another object of the invention is to provide a supertwisted nematic liquid-crystal display device having a high contrast, the voltageless state being substantially completely dark and colourless, and the voltage on state being highly transparent.

A further object of the invention is to provide a foil or an anisotropic layer which can be manufactured with the desired accuracy in a simple manner.

Another object of the invention is to provide a material which can suitably be used in the birefringent foil or layer.

According to the invention, these objects are achieved by a liquid-crystal display device as described in the opening paragraph, characterized in that the birefringent foil or layer of optically anisotropic material is formed from a synthetic resin composition which comprises a polymer network having a helicoidal order. The synthetic resin composition is preferably manufactured from a curable liquid-crystalline composition having a chiral dopant.

In a preferred embodiment of the display device according to the invention, the synthetic resin composition is formed by curing liquid-crystalline monomers or oligomers which consist of compounds with two or more acrylate-ester groups. Instead of acrylate compounds, epoxides, vinyl ethers and thiolene compounds can alternatively and satisfactorily be used as liquid-crystalline monomers.

An ordered synthetic resin composition can be obtained, for example, by orienting a liquid-crystalline monomer and freezing said orientation by exposure to UV light in the presence of a light-sensitive initiator.

A chiral dopant, for example, a compound with an asymmetrically substituted carbon atom is added to the monomer. This dopant brings about a rotation of the monomer molecules in a direction perpendicular to the longitudinal axis of the molecules. By arranging the monomer between two polyimide-coated and rubbed surfaces or other orienting surfaces such as obliquely deposited SiO, the degree of rotation can be adjusted as a function of the natural pitch (the pitch without the presence of such surfaces), the distance between the rubbed surfaces and the direction of rubbing of the surfaces. Subsequently, the rotation in the still liquid monomer composition is fixed by polymerization of the reactive end groups under the influence of UV light or irradiation using electrons. The desired order is rapidly obtained and is substantially perfect, so that a clear film or thin layer is attained. As a result of the use of monomers having at least two functional groups an ordered polymer network is maintained up to very high temperatures.

Preferably, a curable composition is used having liquid-crystalline monomers or oligomers which consist of compounds with two or more acrylate-ester groups. If desirable, the curable synthetic resin composition may comprise a mixture of various oligomeric compounds. Besides, the synthetic resin composition may comprise one or more other suitable components such as, for example, catalysts, (light-sensitive) initiators, stabilizers, co-reacting monomers and surface-active compounds. It is alternatively possible to add, for example, a quantity of up to 50% by weight of a nonpolymerizable liquid-crystalline material to adapt the optical properties of the material.

Suitable compounds which can be cured in the oriented state, U.S. Pat. No. 4,758,447. In the application described although, no helicoidal order is pursued. A method of manufacturing suitable compounds is described in European Patent Application 0 261 712.

As a rapid curing of the composition is desired, the curing operation is initiated, preferably, by means of actinic radiation. The expression actinic radiation is to be understood to mean herein radiation using light, in particular UV light, X-rays, gamma rays or radiation using high-energy particles such as electrons or ions.

BRIEF DESCRIPTION OF THE DRAWING

The invention will be explained in greater detail by means of an exemplary embodiment and with reference to the accompanying drawing, in which.

EXEMPLARY EMBODIMENT

Figure 1:
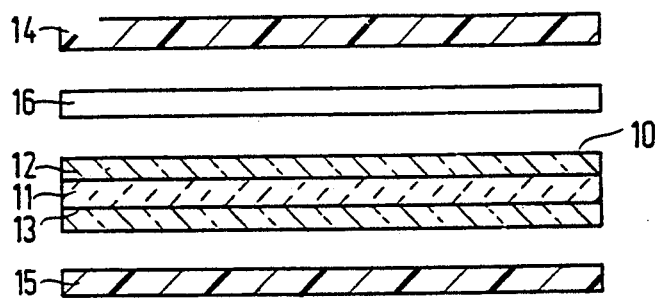
FIG. 1 is a diagrammatic cross-sectional view of a liquid-crystal display device according to the invention.

FIG. 1 is a diagrammatic cross-sectional view of a liquid-crystal display device comprising a liquid-crystal cell 10 which is composed of a twisted nematic liquid-crystalline layer 11 between two electroded transparent substrates 12, 13. The electrodes on the substrates 12, 13 are not shown in the drawing. The device also comprises two polarizers 14, 15 and a birefringent compensation layer or film 16 (if desirable in the shape of a thin layer on a substrate of, for example, glass) is arranged between the polarizers 14, 15, as is the liquid-crystal cell 10.

The birefringent layer 16 may alternatively be arranged, directly on the cell 10, for example by providing a rubbed polyimide layer on the outside of the cell and applying a layer of a suitable curable liquid crystal composition thereto. The orientation of the layer is obtained by applying an additional glass plate provided with a rubbed polyimide layer which is removed after the polymerization.

The thickness of layer 16 is, for example, 6 μm. The molecular axis at the front of the compensation layer 16 extends perpendicularly to the molecular axis at the rear of the twisted nematic liquid-crystalline layer 11. In the case of crossed polarizers this results in the voltageless state in no transmission at any wavelength in the visible range and, hence, a colourless layer.

The adaptation of the layer 16 to the liquid-crystal cell 10 may be performed in various ways. The layer thickness and the total twist angle are determined by the way in which the rubbed surfaces are arranged relative to each other and relative to the curable composition. The natural pitch can be influenced by changing the concentration of the chiral dopant. The birefringence can be varied within the range relevant to supertwisted nematic liquid-crystalline display devices by varying the polymerization temperature.

EXAMPLE

Figure 2:
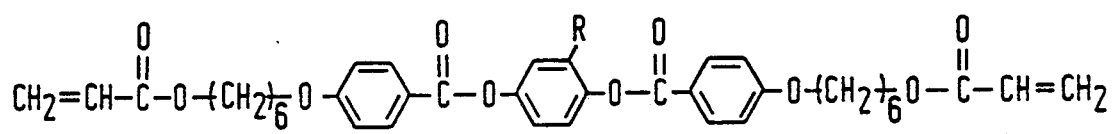
FIG. 2 shows the structural formula of liquid-crystalline compounds having two acrylate-ester groups, and suitable for use in the invention.

A starting mixture for a curable composition is manufactured from 80 parts by weight of a first diacrylate compound A, having the structure shown in FIG. 2, where R is a methyl group, also having the structure 20 parts by weight of a second diacrylate compound B, also having the structure shown in FIG. 2, where R is a hydrogen atom, and 1 part by weight of a light-sensitive initiator, in the present example 2,2-dimethoxy-2-phenyl-acetophenone, commercially available from Ciba-Geigy under the trade name Irgacure$^{(R)}$ 651. A method of manufacturing the diacrylate compounds is described in EP-AI-0 261 712. The starting mixture additionally comprises 100 ppm of a stabilizer, for example hydroquinone monomethyl ether.

The starting mixture comprising 80 parts by weight of A and 20 parts by weight of B is a eutectic composition having a melting point of 80° C. above which exists a nematic phase which changes into an isotropic phase at a temperature of 121° C. The mixture is used between these two temperatures, the highest viscosity and highest molecular order being obtained at the lowest temperatures.

Figure 3:
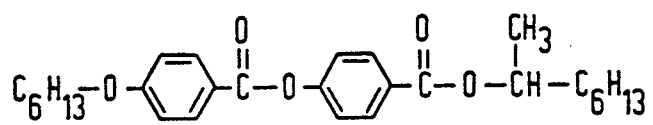
FIG. 3 shows the structural formula of a suitable chiral dopant.

According to the present example, different quantities of a chiral dopant are added to the starting mixture, for example left-handed 4-(4-hexyloxy-benzoyloxy)-benzoic acid-2-octyl-ester, having the structure shown in FIG. 3, commercially available from Merck under the number S811. The chiral dopant itself does not have to exhibit liquid-crystalline properties, and may be both a copolymerizing monomer and a nonpolymerizable compound. To obtain a twisted nematic order in the polymer it is sufficient for the compound to be chiral. The chiral dopant may be left-handed or right-handed.

A layer of the material thus obtained exhibits a nematic order, with a helical structure, also termed cholesteric order. The natural pitch of the mixture depends on the quantity of the chiral dopant added and is approximately 28 μm at 0.5 mol. % and approximately 2.5 μm at 6 mol. %. The natural pitch depends to a small extent on the temperature and is 2.17 μm at 80° C., 2.31 μm at 100° C. and 2.35 μat 113° C. when 6.67 mol. % of the chiral compound is used. The transition to the isotropic phase depends on the quantity of the chiral additive, and at such a quantity takes place at a temperature of 114° C.

According to this example, the curable synthetic composition is cured by photopolymerization using exposure to ultraviolet light for 3 minutes produced by a short-arc mercury lamp at 100° C. having a radiation intensity on the surface to be cured from 2 to 5 mW/cm$^2$. During curing the orientation is fixed, the overall rotation angle of the layer remaining constant. The rotation angle is a measure of the number of revolutions in the molecular spiral in the cholesteric nematic phase. For this reason, the variation in pitch during curing depends only on the change in layer thickness as a result of possible polymerization shrinkage.

In the above example, the birefringence is 0.114 at a polymerization temperature of 100° C., after polymerization at 112° C. the birefringence is 0.108.

In the polymerization operation substantially no change takes place in the product $d\Delta n$ d being the layer thickness and $\Delta n$ being the birefringence of the material. As the material shrinks in only one direction during polymerization, the change in layer thickness is inversely proportional to the change in density of the material, which latter quantity is proportional to the degree of birefringence.

The rotation angle of the polymer film thus obtained exhibits no temperature dependence in the range from room temperature to 250° C. demonstrating the complete resistance to molecular re-orientation as a result of the network of polymer molecules formed by cross-linking. As the monomers contain two acrylate-ester groups per molecule, cross-linking is so strong that substantially no movement is possible in the rigid parts of the liquid-crystalline molecules.

In comparison with, for example, cholesteric polymers having chiral groups in side chains, the pitch has a small temperature dependence.

Within certain limits, the pitch can be influenced by curing the synthetic resin composition between two substrates. Having a cladding of an orienting material such as rubbed polyimide. The polyimide surface is rubbed uniaxially, for example with a velvet cloth. The pitch depends on the distance between the two substrates, according to this example, 6 $\mu$m, and the angle between the two directions of rubbing the polyimide surfaces. The number of revolutions of the molecular spiral adjusts itself such that the pitch obtained does not differ much from the natural pitch.

Figure 4:
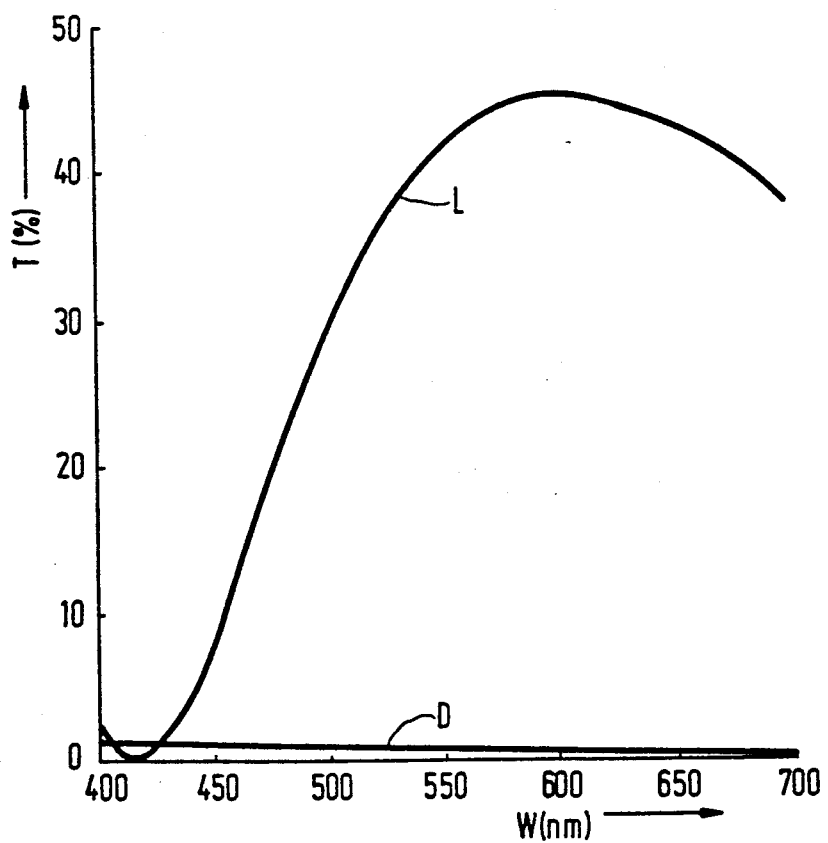
FIG. 4 shows the light transmission T in percent through a device according to the invention as a function of wavelength W in nanometers in the voltageless D and the voltage-on L states.

FIG. 4 shows the optical transmission T in percent as a function of the wavelength W in nanometers for a device according to the invention, having an anisotropic layer with a thickness of 6 $\mu$m and a rotation angle of 180°. In the voltageless or dark state (D) there is a uniformly low transmission throughout the measured wave length range. The dark state is colourless, which results in an optimum contrast. For comparison, the voltage-on or light state (L) is also shown, for which a peak transmission of approximately 45% is attained. The light state exhibits some degree of coloration but this is of less importance for the contrast than that of the dark state.

We claim:

1. A liquid-crystal display device comprising a liquid-crystal cell having a twisted nematic liquid-crystal material arranged between two electrodes, said electrodes being provided on transparent substrates, opposing polarizers arranged on the outside of said cell and opposing said substrates and a layer of an optically anisotropic material provided between one of said polarizers and said cell, said layer of optically anisotropic material being a cross-linked synthetic resin composition comprising a polymer network having a helicoidal order and formed by polymerization of mixture of liquid crystalline monomers or oligomers, each of said monomers or oligomers having mesogenic groups and at least two polymerizable functional groups selected from the group consisting of acrylate ester, epoxy vinyl ether and thiolene moieties and a chiral dopant.

2. The liquid-crystal display device of claim 1 wherein each of said monomers or obigomers have at least two acrylate-ester groups.

* * * * *

UNITED STATES PATENT AND TRADEMARK OFFICE
CERTIFICATE OF CORRECTION

PATENT NO. : 5,210,630

DATED : May 11, 1993

INVENTOR(S) : Ingrid E.J.R. Heynderickx, Dirk J. Broer and Rifat A.M. Hikmet

It is certified that error appears in the above-indentified patent and that said Letters Patent is hereby corrected as shown below:

Col. 1, line 55, "wavelenghts" should be --the wavelength--.

Col. 2, line 13, there should be, as a centered heading: --OBJECTS AND SUMMARY OF THE INVENTION--.

Col. 3, line 18, should read --ented state are described in U.S. Patent No. 4,758,447--;

line 19, should read --although no helicoidal order is pursued. A--.

Col. 4, line 19, should read --where R is a methyl group, 20--;

line 44, "may be both" should be --may be--;

line 45, "and" should be --or--.

Col. 5, line 30, "substrates. Having" should read --substrates having--.

Col. 6, line 27, "mixture" should be --a mixture--.

Signed and Sealed this

Eighteenth Day of October, 1994

Attest:

BRUCE LEHMAN

*Attesting Officer*  *Commissioner of Patents and Trademarks*